(12) United States Patent
Pelletier et al.

(10) Patent No.: US 10,066,991 B2
(45) Date of Patent: Sep. 4, 2018

(54) OPTICAL PROCESSING OF MULTIPLE SPECTRAL RANGES USING INTEGRATED COMPUTATIONAL ELEMENTS

(71) Applicant: Halliburton Energy Services, Inc., Houston, TX (US)

(72) Inventors: Michael T. Pelletier, Houston, TX (US); William J. Soltmann, The Woodlands, TX (US); Raj Pai, Houston, TX (US); James E. Masino, Houston, TX (US); Christopher M. Jones, Houston, TX (US); David L. Perkins, Easton, PA (US); Aditya B. Nayak, Houston, TX (US); James M. Price, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/309,171

(22) PCT Filed: Dec. 31, 2014

(86) PCT No.: PCT/US2014/073082
§ 371 (c)(1),
(2) Date: Nov. 4, 2016

(87) PCT Pub. No.: WO2016/108918
PCT Pub. Date: Jul. 7, 2016

(65) Prior Publication Data
US 2017/0059406 A1 Mar. 2, 2017

(51) Int. Cl.
*G01N 21/25* (2006.01)
*G01J 3/02* (2006.01)
(Continued)

(52) U.S. Cl.
CPC ........... *G01J 3/0259* (2013.01); *G01J 3/2803* (2013.01); *G01J 3/36* (2013.01); *G01J 2003/1226* (2013.01); *G01J 2003/2816* (2013.01)

(58) Field of Classification Search
CPC .... G01J 3/02; G01J 3/36; G01J 3/0259; G01J 3/2803; G01J 2003/1226;
(Continued)

(56) References Cited

U.S. PATENT DOCUMENTS

| 8,760,644 B2 | 6/2014 | Seckar |
| 2009/0219512 A1 | 9/2009 | Myrick et al. |

(Continued)

OTHER PUBLICATIONS

International Search Report and Written Opinion of PCT Application No. PCT/US2014/073082 dated Sep. 22, 2014: pp. 1-15.

*Primary Examiner* — Jamil Ahmed
(74) *Attorney, Agent, or Firm* — Chamberlain Hrdlicka

(57) ABSTRACT

Systems, tools, and methods are presented for processing a plurality of spectral ranges from an electromagnetic radiation that has been interacted with a fluid. Each spectral range within the plurality corresponds to a property of the fluid or a constituent therein. In one instance, a series of spectral analyzers, each including an integrated computational element coupled to an optical transducer, forms a monolithic structure to receive interacted electromagnetic radiation from the fluid. Each spectral analyzer is configured to process one of the plurality of spectral ranges. The series is ordered so spectral ranges are processed progressively from shortest wavelengths to longest wavelengths as interacted electromagnetic radiation propagates therethrough. Other systems, tools, and methods are presented.

24 Claims, 7 Drawing Sheets

(51) Int. Cl.
*G01J 3/28* (2006.01)
*G01J 3/36* (2006.01)
*G01J 3/12* (2006.01)

(58) Field of Classification Search
CPC . G01J 2003/2816; G01K 13/00; G01N 21/17; E21B 49/08; E21B 47/12; E21B 43/12; E21B 43/128
See application file for complete search history.

(56) References Cited

U.S. PATENT DOCUMENTS

| | | |
|---|---|---|
| 2010/0165134 A1 | 7/2010 | Dowski, Jr. et al. |
| 2011/0108719 A1 | 5/2011 | Ford et al. |
| 2013/0287061 A1* | 10/2013 | Freese ............... G01K 13/00 374/142 |
| 2014/0352953 A1* | 12/2014 | Gao ................... E21B 43/128 166/250.15 |
| 2016/0032718 A1 | 2/2016 | Jones et al. |
| 2016/0084068 A1 | 3/2016 | Pelletier et al. |
| 2016/0139085 A1 | 5/2016 | Pelletier et al. |

* cited by examiner

OPTICAL PROCESSING OF MULTIPLE SPECTRAL RANGES USING INTEGRATED COMPUTATIONAL ELEMENTS

TECHNICAL FIELD

The present disclosure relates generally to the measurement of characteristics of a substance using integrated computational elements, and more particularly, to systems, tools, and methods to analyze and process multiple spectral ranges of electromagnetic radiation that has been interacted with the substance. The integrated computational elements optically process the electromagnetic radiation within a plurality of spectral ranges to produce a corresponding number of weighted electromagnetic spectra. The weighted electromagnetic spectra enable the measurement of various chemical or physical characteristics of the substance.

BACKGROUND

When drilling or producing fluids from an oil and gas well, certain instruments may be included in the drill string or production string to learn about the properties of the fluids being produced by the well. To determine such characteristics, sampling chambers and other, similar devices may be included in drill strings or production strings or at the surface of the well to gather samples for analysis. The samples may be analyzed using a number of analytic tools to determine the fluid's composition, the fluid of other fluids that are constituent in the fluid, and other characteristics.

BRIEF DESCRIPTION OF THE DRAWINGS

Illustrative embodiments of the present disclosure are described in detail below with reference to the attached drawing figures, which are incorporated by reference herein and wherein.

Figure 1:
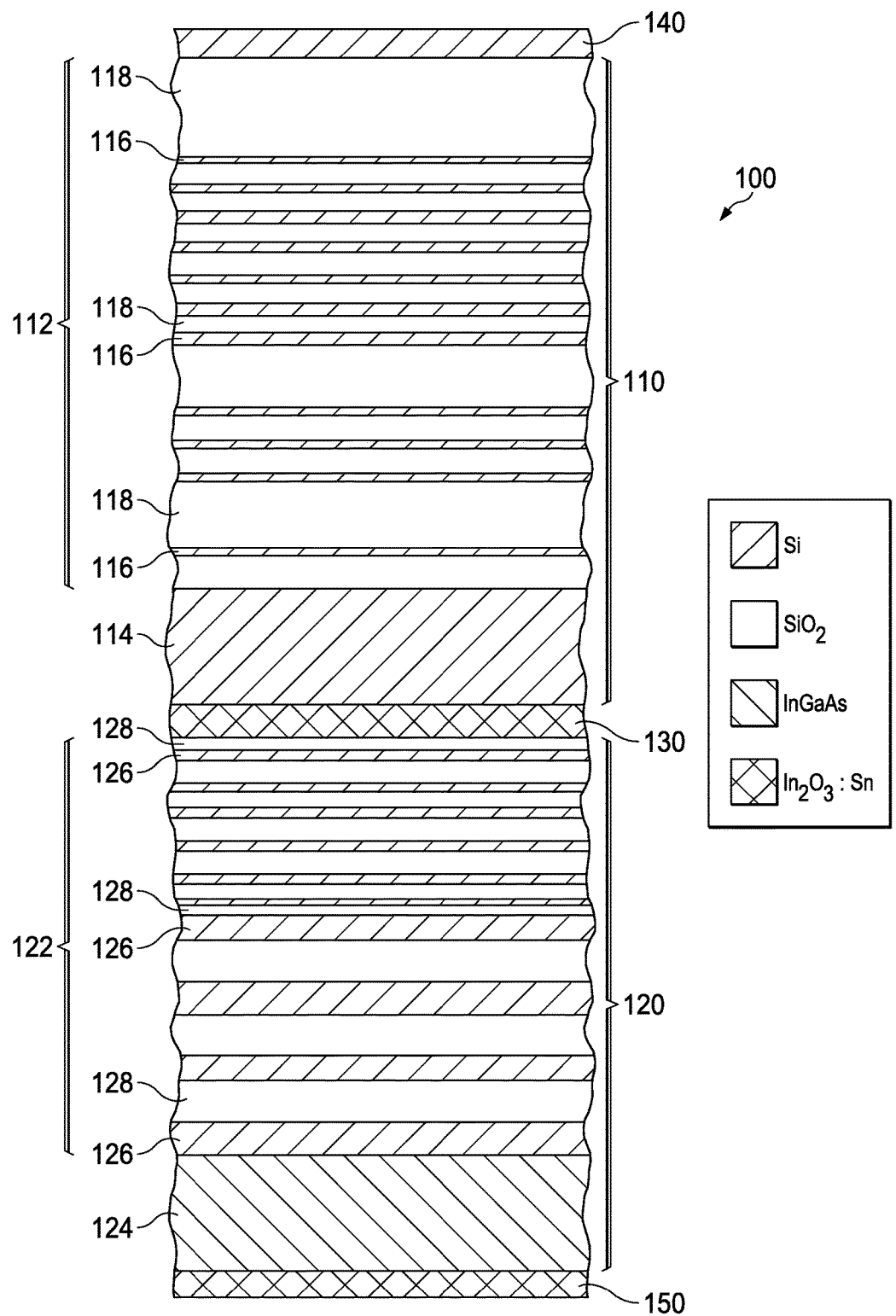
FIG. 1 is a cross-sectional view of a portion of an illustrative embodiment of a monolithic multi-band integrated computational elements device for processing a plurality of spectral ranges from electromagnetic radiation that has been interacted with a fluid.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

In the drawings and description that follow, like parts are typically marked throughout the specification and drawings with the same reference numerals or coordinated numerals. The drawing figures are not necessarily to scale. Certain features of the invention may be shown exaggerated in scale or in somewhat schematic form and some details of conventional elements may not be shown in the interest of clarity and conciseness.

Information about a substance can be derived through the interaction of electromagnetic radiation, e.g., light, with that substance. The interaction changes the characteristics of the electromagnetic radiation to form a sample electromagnetic radiation. For example, interacted light may change with respect to frequency (and corresponding wavelength), intensity, polarization, or direction (e.g., through scattering, reflection, or refraction). This sample electromagnetic radiation may be detected and processed within one or more spectral ranges to determine chemical or physical properties of the substance (e.g., compositional, thermal, physical, mechanical, and optical properties among others). The properties can be determined based on changes in the characteristics of the electromagnetic radiation. As such, in certain applications, one or more properties of substances such as crude petroleum, gas, water, or other production fluids from a wellbore can be derived downhole, or in situ, upon emergence out of the production fluids from a subterranean reservoir as a result of the interaction between the substance and electromagnetic radiation. An integrated computational element (ICE) can be used to detect and analyze sample electromagnetic radiation to determine properties of the fluid.

As used herein, the term "characteristic" or "characteristic of interest" refers to a chemical, mechanical, or physical property of a substance or a sample of the substance. The characteristic of a substance may include a quantitative or qualitative value of one or more chemical constituents or compounds present therein or any physical property associated therewith. Such chemical constituents and compounds may be referred to herein as "analytes." Illustrative characteristics of a substance that can be analyzed with the help of the optical processing elements described herein can include, for example, chemical composition (e.g., identity and concentration in total or of individual components), phase presence (e.g., gas, oil, water, etc.), impurity content, pH, alkalinity, viscosity, density, ionic strength, total dissolved solids, salt content (e.g., salinity), porosity, opacity, bacteria content, total hardness, transmittance, state of matter (solid, liquid, gas, emulsion, mixtures thereof, etc.), and the like.

As used herein, the term "substance" or "sample," or variations thereof, refers to at least a portion of matter or material of interest to be tested or otherwise evaluated using the optical computing devices described herein. The substance includes the characteristic of interest, as defined above. The substance may be any fluid capable of flowing, including particulate solids, liquids, gases (e.g., air, nitrogen, carbon dioxide, argon, helium, methane, ethane, butane, and other hydrocarbon gases, hydrogen sulfide, and combinations thereof), slurries, emulsions, powders, muds, glasses, mixtures, combinations thereof, and may include, but is not limited to, aqueous fluids (e.g., water, brines, etc.), non-aqueous fluids (e.g., organic compounds, hydrocarbons, oil, a refined component of oil, petrochemical products, and the like), acids, surfactants, biocides, bleaches, corrosion inhibitors, foamers and foaming agents, breakers, scavengers, stabilizers, clarifiers, detergents, treatment fluids, fracturing fluids, formation fluids, or any oilfield fluid, chemical, or substance commonly found in the oil and gas industry. In some cases, the substance may also refer to a solid material such as, but not limited to, rock formations, concrete, solid wellbore surfaces, pipes or flow lines, and solid surfaces of any wellbore tool or projectile (e.g., balls, darts, plugs, etc.).

As used herein, the term "electromagnetic radiation" refers to radio waves, microwave radiation, terahertz, infrared and near-infrared radiation, visible light, ultraviolet light, X-ray radiation and gamma ray radiation.

The present disclosure relates to integrated computational elements that apply regression techniques to enable the measurement of various chemical or physical properties of substances. In a wellbore environment, the integrated computational elements may be included in a measurement unit or other downhole tool that is disposed in a drill string or production string to gather information about a production fluid being produced in a wellbore. In an embodiment, an integrated computational element may be formed with a substrate, such as an optically-transparent substrate having multiple stacked dielectric layers or films (e.g., 2 to 50 or more layers). In such stacks, each layer or film has a different refractive index from adjacent neighboring layers. While layers or films are referenced herein, it should be understood that the integrated computational element is not an optical filter, but instead may be an optical processor capable of conducting regression techniques using electromagnetic radiation. In an embodiment, sample electromagnetic radiation is optically processed by the integrated computational element to isolate a spectrum specific to a chemical constituent, or more broadly, to a substance containing multiple chemical constituents. The integrated computational element may receive electromagnetic radiation from a production fluid that has been reflected, transmitted, scattered, diffracted, or absorbed by, emitted, or re-radiated, any of which may be referred to herein as an "interaction". After receiving the sample interacted electromagnetic radiation, the integrated computational element may process the sample interacted electromagnetic radiation, which may also be referred to as the sample electromagnetic radiation, to weight the sample electromagnetic radiation on a per-wavelength basis within a spectral range and, in combination with an optical transducer, produce an output signal for subsequent analysis by a controller or wellbore operator. The weighting and light measuring process may produce a weighted electromagnetic spectrum signal that is representative of the chemical constituent or substance of the production fluid.

The embodiments described herein relate to systems, tools, and methods for processing a plurality of spectral ranges from electromagnetic radiation that has been interacted with a fluid. Each spectral range within the plurality has been predetermined to correspond to a property of the fluid or a constituent therein.

In an illustrative embodiment, a series of spectral analyzers, each including an integrated computational element coupled to an optical transducer, forms a monolithic structure to receive a sample electromagnetic radiation from a substance, which may be, but is not limited to, a production fluid being extracted from a geologic formation. For example, in an embodiment including a first spectral analyzer and a second spectral analyzer to form a monolithic measurement unit, the first spectral analyzer may include a first integrated computational element optically coupled (e.g., deposited) on a first optical transducer, and the second spectral analyzer may include a second integrated computational element optically coupled (e.g., deposited) on a second optical transducer. The first spectral analyzer and the second spectral analyzer may then be optically coupled to each other, such as by having the first optical transducer deposited on an electrode (e.g., transparent electrode), with the electrode then deposited on the second integrated computational element. Each spectral analyzer is configured to process one of the plurality of spectral ranges. The series of spectral analyzers is ordered so that spectral ranges are processed, for example, progressively from shortest wavelengths to longest wavelengths as the sample electromagnetic radiation propagates therethrough. The monolithic structure therefore enables the measurement of one or more properties of the fluid within a unified device. The monolithic structure may provide significant space savings over multiple discrete devices operating together to provide the same functionality. The device may be included in a tool string, such as a drill string or production string, for analyzing the production fluid in situ.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

The various characteristics mentioned above, as well as other features and characteristics described in more detail below, will be readily apparent to those skilled in the art with the aid of this disclosure upon reading the following detailed description of the embodiments, and by referring to the accompanying drawings.

Now referring primarily to FIG. 1, a cross-sectional view of a portion of an illustrative embodiment is shown of an apparatus which may be viewed as a unified sensor, measurement unit, or device 100 for processing a plurality of spectral ranges from an electromagnetic radiation that has been interacted with a fluid. The apparatus 100 may include a first spectral analyzer 110 and a second spectral analyzer 120 that form a series. Each spectral analyzer 110, 120 may include an integrated computational element 112, 122 and an optical transducer 114, 124. In the illustrative embodiment, a first integrated computational element 112 is coupled to (e.g., deposited on) a first optical transducer 114 to process a first spectral range of a first spectral analyzer 110. Similarly, a second integrated computational element 122 is coupled to (e.g., deposited on) a second optical transducer 124 to process a second spectral range of a second spectral analyzer 120. As will be described below, the integrated computational elements 112, 122 and their respective optical transducers 114, 124 are configured to enable the corresponding spectral analyzers 110, 120 to operate within a desired spectral range.

The spectral analyzers 110, 120 may be oriented so that the series exhibits an alternating sequence of integrated computational elements 112, 122 and optical transducers 114, 124. The spectral analyzers 110, 120 may also be ordered so that the apparatus 100 processes spectral ranges progressively from shortest wavelengths to longest wavelengths as electromagnetic radiation propagates through the series. The first spectral analyzer 110 may be coupled in series to the second spectral analyzer 120 by a transparent electrode 130 to form a monolithic structure. For example, in one embodiment, the first spectral analyzer 110 may be deposited on the transparent electrode 130, with the transparent electrode 130 deposited on the second spectral analyzer 120, thereby forming a monolithic structure with the first spectral analyzer 110, the transparent electrode 130, and the second spectral analyzer 120. Although FIG. 1 depicts the apparatus 100 as having two spectral analyzers 110, 120 and a single transparent electrode 130, this depiction is not intended as limiting. Other numbers of spectral analyzers and transparent electrodes are possible for the monolithic structure, e.g., three spectral analyzers coupled in series by two transparent electrodes, four spectral analyzers coupled in series by three transparent electrodes, and so forth. In some embodiments, the monolithic structure may include an optional capping layer 140 that, during operation, may be exposed to the fluid. Further, in one or more embodiments, as the apparatus 100 may be formed as a monolithic structure, each of the spectral analyzers within the apparatus 100 may be able to analyze the same sample fluid or same fluid volume, thereby enabling a more dependable analysis and comparison amongst the spectral analyzers.

A first integrated computational element 112 of the first spectral analyzer 110 and a second computational element 122 of the second spectral analyzer 120 include alternating layers of high refractive index layers 116, 126 and low refractive index layers 118, 128 of materials. In the embodiment illustrated by FIG. 1, the layers of high refractive index layers 116, 126 are formed of silicon and those of low refractive index layers 118, 128 are formed of silicon dioxide. This embodiment, however, is not intended as limiting. The high refractive index layers 116, 126 may be formed of other materials that have a high refractive index. Non-limiting examples of such materials include germanium, aluminum arsenide, gallium arsenide, indium phosphide, silicon carbide, and titanium dioxide. Additional semiconductor or dielectric materials are possible. Similarly, the low refractive index layers 118, 128 may be formed of other materials that have a low refractive index. Non-limiting examples of these materials include germanium dioxide, magnesium fluoride, and aluminum oxide.

The number of layers, the materials used for each layer, and the different refractive indices in the integrated computational elements 112, 122 are selected to optically process electromagnetic radiation within the desired spectral range (e.g., the first spectral range and the second spectral range). However, the configuration shown in FIG. 1 is not intended as limiting. For example, the integrated computational elements 112, 122 may include three or more materials having different refractive indices and a plurality of high refractive index layers 116, 126 and low refractive index layers 118, 128 may be included in each computational element 112, 122 to accommodate the desired spectral range. Furthermore, the integrated computational elements 112, 122 need not include the same high refractive-index and low refractive-index materials. The high refractive index layers 116, 126 of the first integrated computational element 112 may also differ from the layers 118, 128 of the second integrated computational element 122 to accommodate variations in spectral ranges processed by, respectively, the first spectral analyzer 110 and the second spectral analyzer 120. Such differences in high refractive-index and low refractive-index materials may also apply to monolithic structures containing more than two spectral analyzers, as described in more detail below.

The optical transducers 114, 124 may include a p-n junction diode or a p-i-n junction diode for converting weighted electromagnetic spectra from the integrated computational elements 112, 122 into electrical signals representing such spectra. Other junction devices, however, are possible (e.g., heterojunctions, avalanche photodiodes, reverse-bias photodiodes, etc.). The optical transducers 114, 124 may be formed of materials that correspond to spectral ranges for, respectively, the first spectral analyzer 110 and the second spectral analyzer 120. More specifically, the first optical transducer 114 may be formed of a first semiconductor material that absorbs wavelengths within the first spectral range but transmits unabsorbed, longer wavelengths to the adjacent spectral analyzer 120. The second optical transducer 124 may be formed of a second semiconductor material that then absorbs a portion of the transmitted wavelengths within the second spectral range. In an embodiment, materials for the optical transducers 114, 124 may be selected so that the first spectral range and second spectral range are substantially non-overlapping. This non-overlapping characteristic may enable spectral ranges to be progressively processed from shortest wavelengths to longest wavelengths as electromagnetic radiation propagates through the unified device. Thus, selection of optical transducer materials may allow monolithic structures including a plurality of stacked spectral analyzers.

In FIG. 1, the first optical transducer 114 is formed of semiconductor material including silicon and the second optical transducer 124 of a second semiconductor material including indium gallium arsenic alloy. The first spectral range (corresponding to silicon) therefore includes wavelengths from approximately 400-1000 nm and the second spectral range (corresponding to indium gallium arsenic alloy) includes wavelengths from approximately 1000-1700 nm. The embodiment of FIG. 1, however, is not intended as limiting. For example, in another embodiment, the first optical transducer 114 may be formed of semiconductor material including silicon and the second optical transducer 124 of semiconductor material including germanium to accommodate wavelengths of, for example, approximately 850-1550 nm. Other complementary groups of semiconductor materials may also be selected depending on the desired spectral range. As an example, it may be useful to characterize a formation hydrocarbon fluid using both the visible and near infrared portion of the sample electromagnetic radiation simultaneously, without the need for two separate devices to reduce the space required to perform the measurements. Also customized devices, as proposed herein, can be made to operate in specific narrow regions of the sample electromagnetic radiation to eliminate one or more regions in the sample electromagnetic radiation that do not provide chemical significance. This may allow improved performance in the measurement of the sample's properties such as increased sensitivities and improved prediction performance.

In one or more embodiments, and as discussed above, the apparatus 100 may include a monolithic structure, such as formed from one or more layers deposited on each other. With reference to FIG. 1, the first spectral analyzer 110 may be optically coupled to the transparent electrode 130, such as by being deposited on the transparent electrode 130. For example, the integrated computational element 112 may be optically coupled to (e.g., deposited on) the optical transducer 114, and the optical transducer 114 may be optically coupled to (e.g., deposited on) the transparent electrode 130. Further, the transparent electrode 130 may be optically coupled to (e.g., deposited on) the integrated computational element 122, such as by having the transparent electrode 130 deposited on a first layer (e.g., an upper most low refractive index layer 128 or high refractive index layer 126) of the integrated computational element 122. The integrated computational element 122 may then be optically coupled to (e.g., deposited on) the optical transducer 124, and the optical transducer 124 may be optically coupled to (e.g., deposited on) the transparent electrode 150. Though the above discusses having components deposited on each other in a manner extending from an uppermost surface to a lowermost surface (with respect to the orientation of FIG. 1), the present disclosure is not so limited. During manufacturing, a lowermost surface may be used first (e.g., the transparent electrode 150), with surfaces then optically coupled or deposited on the next uppermost surface to build the apparatus 100 from bottom to top, as shown with respect to FIG. 1.

FIG. 1 is also not intended to limit the apparatus 100 to two optical transducers 114, 124 (i.e., two spectral analyzers 110, 120). In some embodiments, the apparatus 100 may include three optical transducers and therefore three spectral analyzers. For example, a first optical transducer may be formed of semiconductor material including silicon, a second optical transducer of semiconductor material including indium gallium arsenic alloy, and a third optical transducer of semiconductor material including germanium. In another example, the first optical transducer may be formed of semiconductor material including aluminum indium phosphorus alloy, a second optical transducer of semiconductor material including indium phosphide, and a third optical transducer of semiconductor material including germanium. Other numbers of spectral analyzers, complementary groups of semiconductor materials, or combinations thereof are possible.

The transparent electrodes 130, 150 may separate the integrated computing elements 112, 122 (and subsequent integrated computing elements (not shown)) and are configured to transmit unabsorbed wavelengths from the first optical transducer 114 to the integrated computational element 122 of the second spectral analyzer 122 as well as an output signal to a signal processor or controller. The transparent electrode 130 may also be operational to collect current produced by the first optical transducer 114 in response to wavelengths absorbed from the sample electromagnetic spectrum. In some embodiments, the transparent electrode 130 may be formed of transparent conducting oxide materials such as indium tin oxide, fluorinated tin oxide, and aluminum zinc oxide. Other transparent conducting oxides are possible. In other embodiments, the transparent electrode 130 may be formed of heavily-doped semiconductor materials such as n+ silicon, n++ silicon, p+ silicon, p++ silicon, n+ InGaAs, n++ InGaAs, p+ InGaAs, p++ InGaAs and so forth. Transparent electrodes formed in such manner are typically derived from the same semiconductor material used in an adjacent optical transducer. For example, a transparent electrode may be formed of n++ silicon coupled to a optical transducer formed of silicon semiconductor material. In still other embodiments, the transparent electrode 130 may be formed of ultra-thin layers of metallic material including, but not limited to, the noble metals (e.g., Ag, Au, Pt) or the transition metals (e.g., Cr, Ni, Ti, Pd). Such metallic materials are not limited to single elements but may also incorporate alloys. In such embodiments, a thickness of the transparent electrode 130 may be below 100 nm.

In operation, the electromagnetic radiation is interacted with, or permeated through the fluid to acquire optical characteristics that represent attributes of the fluid by analyzing a sample electromagnetic radiation. The sample electromagnetic radiation may be received by the (outward facing) capping layer 140, if present, and transmitted to the first spectral analyzer 110. The first integrated computational element 112 of the first spectral analyzer 110 optically processes the sample electromagnetic radiation to produce a spectral weighting which may be a wavelength-dependent weighting. More specifically, the layers 116, 118 may induce reflection, refraction, interference, or a combination thereof within the first integrated computational element 112 to alter an intensity of the sample electromagnetic radiation on a per-wavelength basis. The spectral weighting may correspond to a regression technique that isolates optical characteristics specific to a property of the fluid or a constituent therein. The sample electromagnetic radiation may exit the first integrated computational element 112 to the second integrated computational element 122 as a first weighted electromagnetic spectrum whose individual wavelengths have been proportionately processed.

The spectral weighting by the first integrated computational element 112 may be controlled by a thickness, a complex index of refraction, and a number of individual layers 116, 118. The thickness, the refractive index (i.e., material), and the number of layers may be selected according to a design of the first integrated computational element 112 to characterize, within the first spectral range, a property of the fluid or a constituent therein. It should be understood that the configuration shown in FIG. 1, however, does not necessarily correspond to any particular fluid property or constituent, but is provided for purposes of illustration only. Furthermore, the layers 116, 118 and their relative thicknesses are not necessarily drawn to scale, and therefore should not be considered limiting of the present disclosure.

The first optical transducer 114 of the first spectral analyzer 110 receives the first weighted electromagnetic spectrum from the first integrated computational element. An absorption threshold partitions the first weighted electromagnetic spectrum into an absorbed spectral range and a transmitted spectral range. The absorption threshold varies with characteristics of the first semiconductor material (e.g., band gap magnitude, band gap type, absorption coefficient, etc.) and a quantum efficiency of the first optical transducer 114. Wavelengths above the absorption threshold are absorbed by first optical transducer 114 within the first spectral range to produce electron-hole pairs. Such electron-hole pairs create a current that is collected at electrodes to generate a first electrical signal that is transmitted to a controller for processing and analysis by a well operator.

The transparent electrode 130 assists with such collection. The first electrical signal represents the first weighted electromagnetic spectrum integrated within the first spectral range. Wavelengths below the absorption threshold are transmitted by the transparent electrode 130 into the second spectral analyzer 120.

The second spectral analyzer 120 operates analogously to the first spectral analyzer 110 but within the second spectral range. The second integrated computational element 122 optically processes the transmitted wavelengths of the first weighted electromagnetic spectrum to produce a second weighted electromagnetic spectrum. The second optical transducer 124 absorbs second weighted electromagnetic spectrum integrated within the second spectral range to generate a second electrical signal using a second transparent electrode 150 that may be transmitted to a controller. The spectral analyzers 110, 120 illustrated in FIG. 1 therefore operate in conjunction to process the first spectral range and the second spectral range. It will be appreciated that the first spectral range and the second spectral range may represent distinct properties of the fluid or one or more constituents therein. However, processing of the first spectral range and the second spectral range may also be used to improve measurement of a single property of the fluid or constituent (e.g., a combination to enhance accuracy).

Although the apparatus 100 of FIG. 1 has been illustrated as containing two spectral analyzers 110, 120, this depiction is not intended to limit the scope of the present disclosure. The specific application of the apparatus 100 will govern the plurality of spectral ranges, and hence, a number of spectral analyzers. For example, and without limitation, the apparatus 100 may be used downhole to allow production fluids from a wellbore to be quickly analyzed. Similarly, the apparatus 100 may also be deployed adjacent cellular tissue to analyze blood, saliva, perspiration, or other biological fluids upon their extraction or secretion. Other fluid types are possible. Other substance types are possible including gases, solids, slurries or emulsion, or combinations therein, relevant to the exploration and processing of reservoir hydrocarbons. For each application, the plurality of spectral ranges and the number of corresponding spectral analyzers are determined by those skilled in the art.

Figure 2:
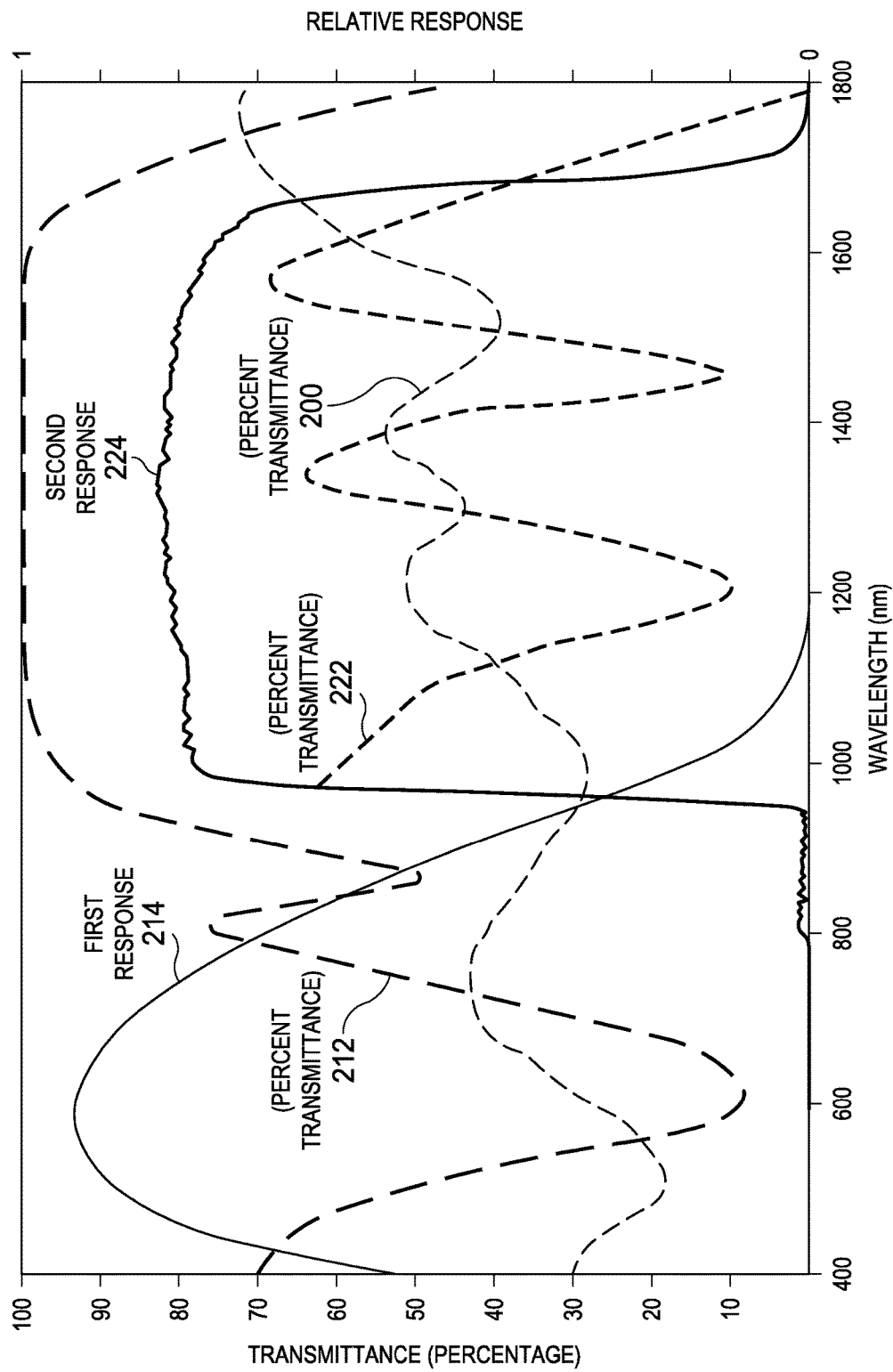
FIG. 2 is a schematic graph of transmittance and relative response profiles associated with the apparatus of FIG. 1 according to one illustrative embodiment.

Now referring primarily to FIG. 2, a schematic graph is presented of five spectral profiles associated with the unified device 100 of FIG. 1 according to one illustrated embodiment. The spectral profiles include first, second, and third transmission profiles 200, 212, 222 and corresponding first and second response profiles 214, 224 which are scaled, respectively, by a leftmost ordinate indicating transmission in percent (%) and a rightmost ordinate indicating relative response. An abscissa (x-axis) indicates wavelengths for the spectral profiles in nanometers (nm). The first transmission profile 212 and a second transmission profile 222 correspond, respectively, to the first integrated computational element 112 and the second computational element 122 of the apparatus 100. Similarly, a first response profile 214 and a second response profile 224 correspond, respectively, to the first optical transducer 114 and the second optical transducer 124 of the apparatus 100. The first response profile 214 and the second response profile 224 also correspond to optical transducers formed of, respectively, silicon semiconductor material and indium gallium arsenide semiconductor material. The schematic graph further provides a sample transmission profile 200 that represents a wavelength-dependent intensity of sample electromagnetic radiation. The spectral profiles depicted in FIG. 2 are for purposes of illustration only and are not intended as limiting of the present disclosure.

In operation, the first integrated computational element 112 of the apparatus 100 optically processes sample electromagnetic radiation so that the sample transmission profile 200 becomes spectrally weighted (i.e., produces a first weighted electromagnetic spectrum). Spectral weighting occurs by scaling the sample transmission profile 200 proportionally according to a wavelength-dependent transmittance, i.e., the first transmission profile 212. The integrated computational element 112 therefore implements a regression technique that fits the sample or input transmission profile 200 to the first transmission profile 212. In FIG. 2, the first transmission profile 212 is illustrated with spectral weighting for wavelengths between approximately 400-1000 nm, but with no spectral weighting between approximately 1000-1700 nm (i.e., a transmittance of 100%). The first optical transducer 114 detects the first weighted electromagnetic spectrum from the first integrated computational element 112 within a wavelength range of approximately 400-1000 nm. Such detection is governed by the first response profile 214 which is analogous to the first spectral range of the first spectral analyzer 110. Thus, the spectral weighting of the first integrated computational element 112 and the response of first optical transducer 114 are matched to enable the first spectral analyzer to process sample electromagnetic radiation within the first spectral range.

The unabsorbed sample transmission profile 200 is transmitted to the second integrated computational element 122 through the transparent electrode 130. The second integrated computational element 122 spectrally weights the transmitted profile according to the second transmission profile 222 to produce a second weighted electromagnetic spectrum. In FIG. 2, the second transmission profile 212 is illustrated with spectral weighting for wavelengths between approximately 1000-1800 nm. The second optical transducer 124 detects the second weighted electromagnetic spectrum from the second integrated computational element 122 according to the second response profile 224 (i.e., within approximately 1000-1700 nm). The second response profile 224 is analogous to the second spectral range of the second spectral analyzer 120. The first optical transducer 114 and the second optical transducer 124 are formed of materials such that their respective response profiles enable substantially non-overlapping spectral ranges. Thus, the first spectral analyzer 110 and the second spectral analyzer 120 may be monolithically coupled in series to progressively process a plurality of spectral ranges from shortest wavelengths to longest wavelengths as sample electromagnetic radiation propagates therethrough.

The first transmission profile 212 of FIG. 2 is depicted as including a spectrally-weighted region and a non-spectrally weighted region. However, the non-spectrally weighted region need not be limited to 100% transmittance. Other profiles for the non-spectrally weighted region are possible. In some embodiments, the first integrated computational element 112 modifies the non-spectrally weighted region using a substantially constant transmission function (e.g., an 80% transmittance). In other embodiments the first integrated computational element 112 modifies non-spectrally weighted region using a predetermined transmission function. In such embodiments, the second integrated computational element 122 is designed to compensate for the predetermined modification of the non-spectrally weighted region.

Figure 3:
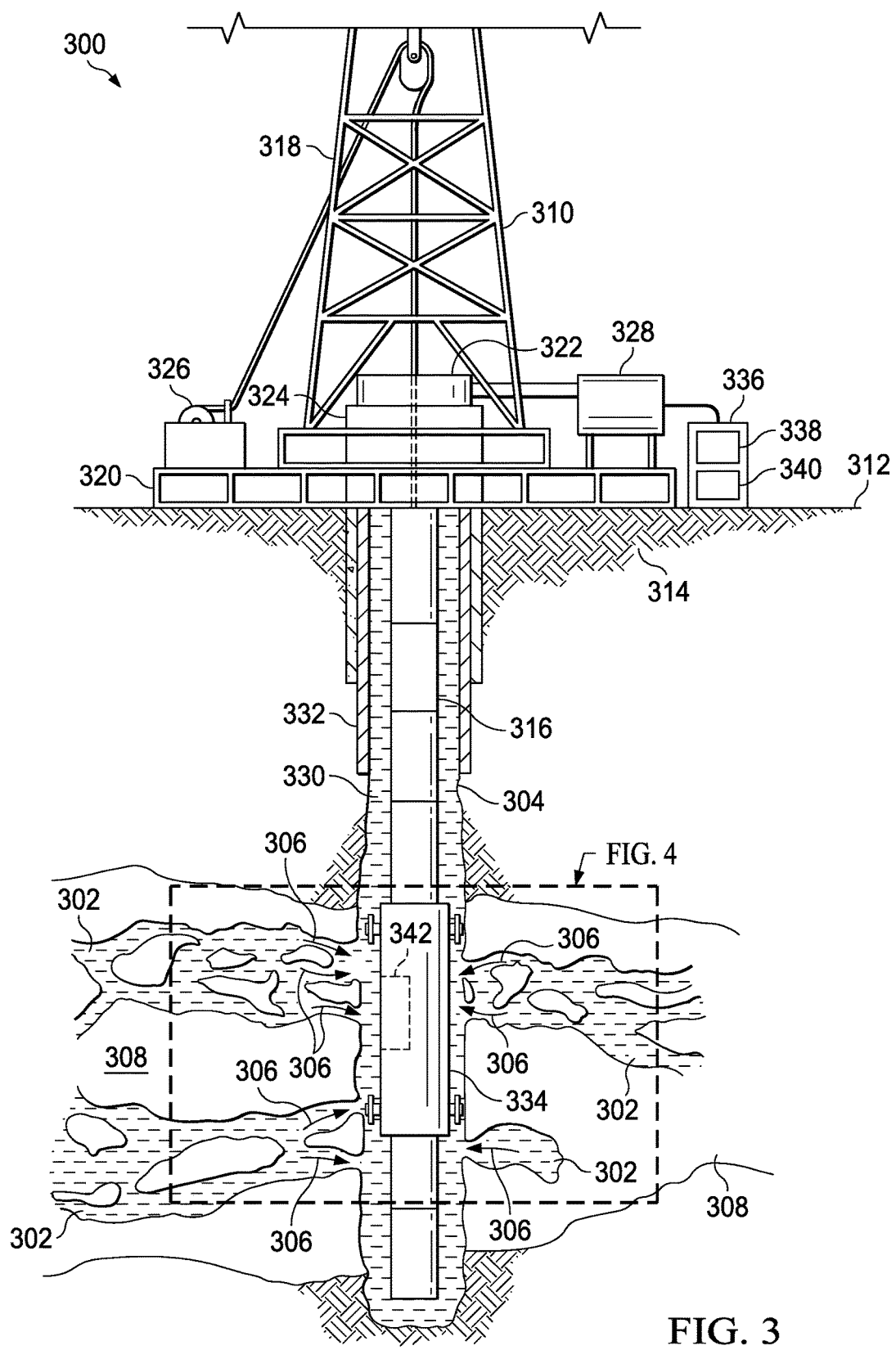
FIG. 3 is a schematic, elevation view of an illustrative embodiment of a production system that facilitates measuring one or more properties of a production fluid from a wellbore.

Referring now primarily to FIG. 3, an illustrative embodiment is presented of a system 300 for measuring one or more properties of a production fluid 302 from a wellbore 304. Measurements by the system 300 are conducted by processing a plurality of spectral ranges from an electromagnetic radiation that has been interacted with a production fluid to produce a sample electromagnetic radiation. In FIG. 3, the system 300 is depicted in proximity to an emergence 306 of the production fluid from a subterranean reservoir 308. This depiction, however, is not intended as limiting and is provided for purposes of illustration only. The system 300 includes a rig 310 atop a surface 312 of a well 314. Beneath the rig 310, the wellbore 304 extends through the subterranean reservoir 308, which is expected to produce hydrocarbons. The wellbore 304 of FIG. 3 is shown as being near-vertical, but may be formed at any suitable angle to reach a hydrocarbon-rich portion of the subterranean reservoir 308. In some embodiments, the wellbore 304 may follow a vertical, partially-vertical, angled, or even a partially-horizontal path through the subterranean reservoir 308.

A production tool string 316 is deployed from the rig 310, which may be a drilling rig, a completion rig, a workover rig, or another type of rig. The rig 310 includes a derrick 318 and a rig floor 320. The production tool string 316 is deployed downward through the rig floor 320, through a fluid diverter 322 and blowout preventer 324 that provide a fluidly sealed interface between the wellbore 304 and external environment, and into the wellbore 304 and subterranean reservoir 308. The rig 310 may also include a motorized winch 326 and other equipment for lowering the production tool string 316 or other equipment into the wellbore 304, retrieving the production tool string 316 from the wellbore 304, and positioning the production tool string 214 at a selected depth within the wellbore 304. Coupled to the fluid diverter 322 is a pump 328. The pump 328 is operational to deliver or receive fluid through an internal bore of the production tool string 316 by applying a positive or negative pressure to the internal bore. The pump 328 may also deliver or receive fluid through an annulus 330 formed between a wall of the wellbore 304 and exterior of the production tool string 316 by applying a positive or negative pressure to the annulus 330. The annulus 330 is formed between the production tool string 316 and a wellbore casing 332 when production tool string 316 is disposed within the wellbore 304.

Following formation of the wellbore 304 or as an aspect of forming the wellbore, the production tool string 316 may be equipped with tools and deployed within the wellbore 304 to probe, operate, or maintain the well 314. Specifically, the production tool string 316 may incorporate a tool 334 that measures one or more properties the production fluid 302 produced by the subterranean reservoir 308. A computational unit 336 having at least one processor 338 and at least one memory 340 is coupled to a measurement unit 342 within the tool 334 (by analogy see 404 in FIG. 4). The computational unit 336 is configured to store data from the measurement unit 342 and to determine one or more properties of the fluid. As will be further detailed below, the measurement unit 342 contains a monolithic structure containing a series of spectral analyzers. The series of spectral analyzers is configured to process the sample electromagnetic radiation from the production fluid 302 in the plurality of spectral ranges.

In operation, the motorized winch 326, in cooperation with other equipment, lowers the production string 316 into the wellbore 304 so that the tool 334 rests proximate the subterranean reservoir 308. The tool 334 measures one or more properties of the production fluid 302 at the production fluid's emergence 306 from the subterranean reservoir 308. The pump 328 may be used to manipulate pressure within the internal bore relative to the annulus 330 to regulate flow out of the subterranean reservoir 308. In some embodiments, a computational unit 336 may activate the measurement unit 342 within the tool 334 continuously, intermittently, or some combination thereof. Such activation enables the tool 334 to monitor the one or more properties of the production fluid 302 as flow exits the subterranean reservoir 308 and enters the wellbore 304.

Figure 6:
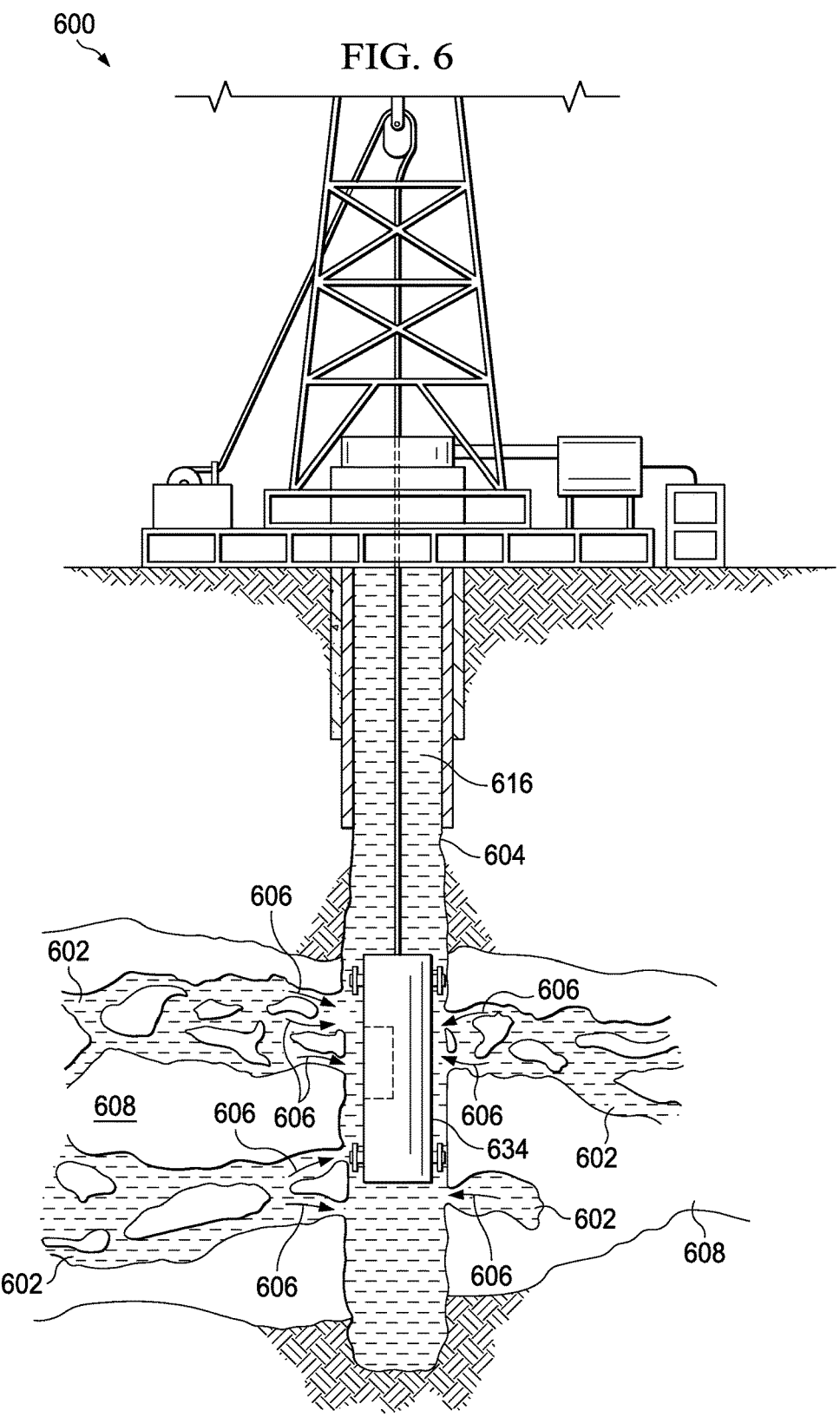
FIG. 6 is a schematic, elevation view of an illustrative embodiment of a production system that facilitates measuring one or more properties of a production fluid from a wellbore.

It is noted that while the operating environment is generally discussed as relating to a land-based well, the systems, tools, and methods described herein may instead be operated in subsea well configurations accessed by a fixed or floating platform. Further, it is noted that while the computational unit 336 and tool 334 are generally described as being deployed in a production environment, such devices may also be included in a drilling system (and drill string) to analyze samples of production fluid taken during logging-while-drilling or measurement-while-drilling operations. Furthermore, it is noted that while the operating environment shown in FIG. 3 relates to a stationary, land-based rig for raising, lowering, and setting the production tool string 316, in alternative embodiments, mobile rigs, wellbore servicing units (e.g., coiled tubing units, slickline units, or wireline units), and the like may be used to lower the production tool string 316 and/or the tool 334. For example, in FIG. 6, an illustrative embodiment is presented for a measurement system 600 for measuring a property of a production fluid 602 from a wellbore 604 in proximity to an emergence 606 of the production fluid from a subterranean reservoir 608. In this embodiment, a tool 634 that characterizes the production fluid 602 produced by the subterranean reservoir 608, which may be analogous to the tool 334 depicted in FIG. 3, may be deployed into the wellbore 604 using a wireline 616.

Figure 7:
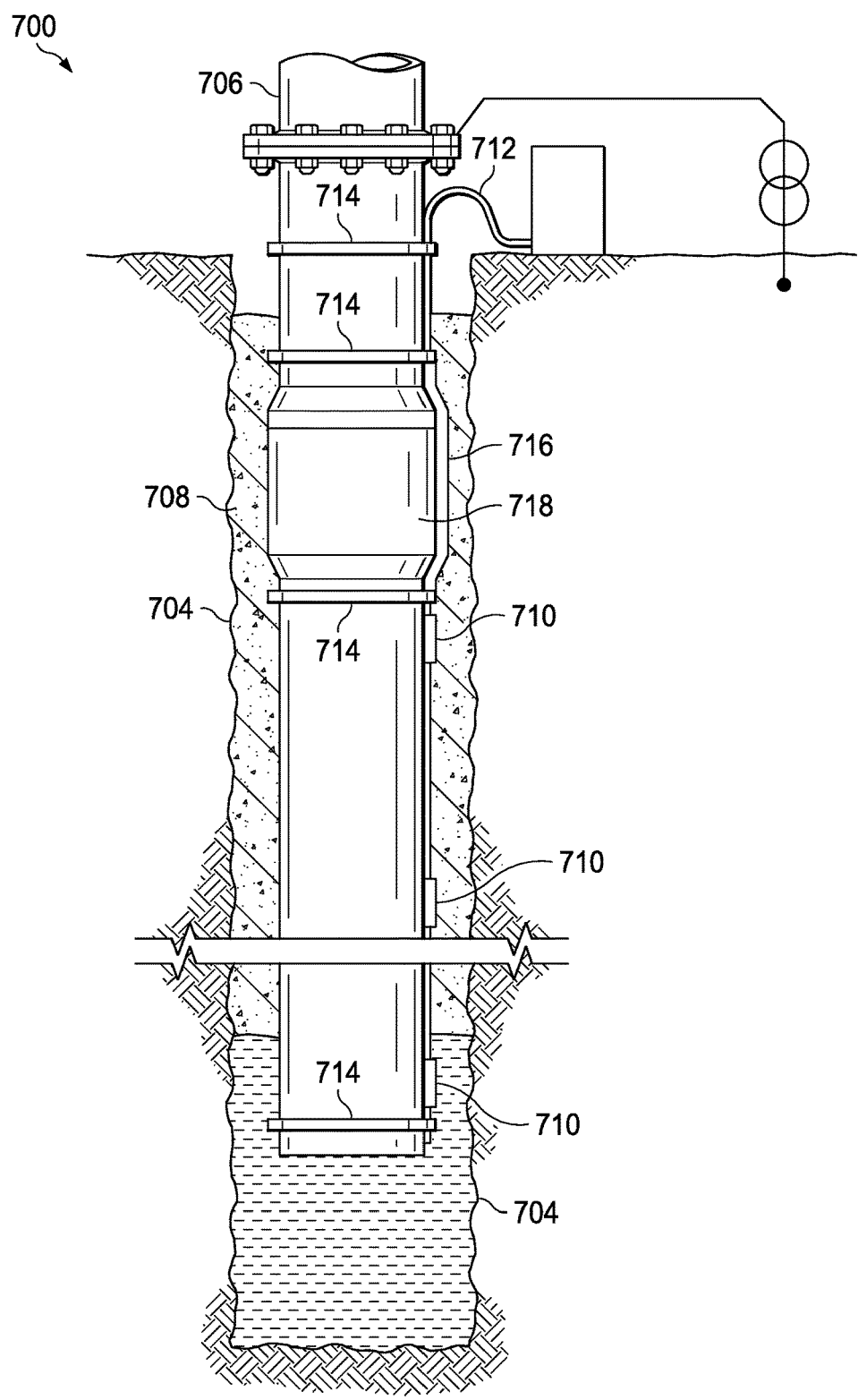
FIG. 7 is a schematic, elevation view of an illustrative embodiment of a production system that facilitates measuring one or more properties of a production fluid from a wellbore.

Additionally or alternatively, one or more embodiments of the present disclosure may involve a permanent monitoring application or environment. For example, in FIG. 7, an illustrative embodiment is presented for a measurement system 700 for measuring a property of a production fluid from a wellbore 704. In this embodiment, a casing string 706 may be positioned within the wellbore 704, in which cement 708 may be used to fill in the annular space between the wellbore 704 and the casing string 706 to secure the casing string 706 within the wellbore 704. A tool, similar to the tool 334 depicted in FIG. 3, may be secured within and/or attached to the casing string 706. Additionally or alternatively, one or more measurement units 710, such as similar to the measurement units 100 depicted below with respect to FIG. 3, may be positioned within or about the casing string 706. In this embodiment, multiple measurement units 710 may be secured to the casing string 706, in which one or more cables 712 may be used to send and/or receive signals from the measurements units 710. The cable 712 may be a fiber optic cable in one or more embodiments, the cable 712 may be secured to the casing string 706 using one or more bands 714, and the cable 712 may be protected using a cable protector 716, such as when positioned adjacent to a casing joint 718.

Figure 4:
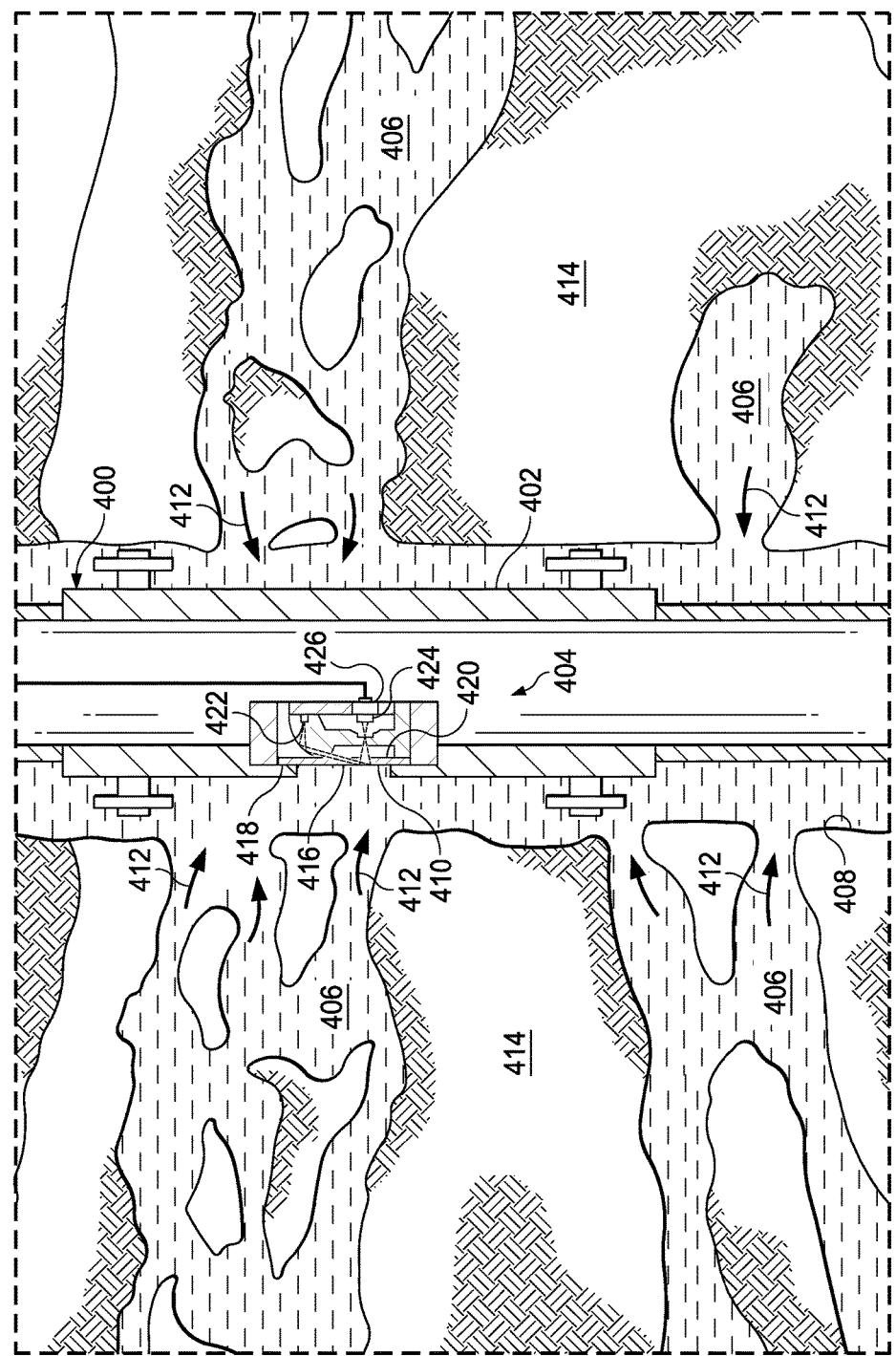
FIG. 4 is a detail view of a portion of the system of FIG. 3 that shows, in cross-section, an illustrative embodiment of a tool for processing a plurality of spectral ranges from electromagnetic radiation that has been interacted with a production fluid from a wellbore.

In FIG. 4, a portion of the system 300 of FIG. 3 is shown in cross-section and includes an illustrative embodiment of a tool or optical computing device 400. The tool 400 is analogous to the tool 334 depicted in FIG. 3 for measuring one or more properties of the production fluid 302. The tool 400 includes a housing 402 having a measurement unit 404 disposed therein. The measurement unit 404 is coupled to a computational unit (not explicitly shown, but by analogy see 336 in FIG. 3) that includes at least one memory and at least one processor. The computational unit is configured to store data from the measurement unit 404 and to determine one or more characteristics of the production fluid 406 using such data. In some embodiments, the computational unit is disposed within the housing 402 of the tool 400. In other embodiments, the computational unit resides at a surface of a well as shown in FIG. 3.

In an embodiment, the measurement unit 404 is exposed to a production fluid 406 from a wellbore 408 by one or more fluid inlets 410 to which the measurement unit 404 is fluidly-coupled. The fluid inlet 410 depicted in FIG. 4 is proximate an emergence 412 of the production fluid 406 from a subterranean formation 414. The measurement unit 404 may include a window 416 having a first, outward-facing side 418 and a second, inward-facing side 420. The first side 418 may be situated opposite the second side 420 and may face the production fluid 406. In FIG. 4, the first side 418 and the second side 420 may be partitioned by a planar body of the window 416. On the second side 420 of the window 416 may be an illumination source 422. The illumination source 422 may be operable to generate electromagnetic radiation that interacts with the production fluid 406. Such interaction with the production fluid 406 may produce a sample electromagnetic radiation for processing as described previously. Non-limiting examples of electromagnetic radiation include light having wavelengths in the short-infrared (i.e., 1400-3000 nm), near-infrared (i.e., 750-1400 nm), visible (i.e., 380-750 nm), and ultraviolet (i.e., 100-380 nm) regions. Other wavelengths are possible. The illumination source 422, however, is not limited to a specific region and may generate electromagnetic radiation that spans two or more regions of light. In some embodiments, the illumination source 422 may be optically-coupled to a band-pass filter. In such embodiments, the band-pass filter may be configured to transmit a predetermined spectrum of electromagnetic radiation from the illumination source 422.

Also on the second side 420 of the window 416 may be a series of spectral analyzers 424 for processing a plurality of spectral ranges from the sample electromagnetic radiation. The series 424 is analogous to the series described in relation to the detector 100 of FIG. 1. Each spectral analyzer of the series 424 may include an integrated computational element coupled to a photodiode and is configured to process one of the plurality of spectral ranges. In some embodiments, the measurement unit 404 may include a conversion circuit 426 coupled to each photodiode and configured to output electrical signals from the coupled photodiodes in a frequency domain or using any suitable multiplexing technique. Frequency domains often allow electrical signals to transmit information over longer distances due to higher signal-to-noise ratios (i.e., relative to absolute voltages or currents).

It will be appreciated that the number of spectral analyzers selected for use in the series 424 is governed by properties or characteristics of the production fluid 406 to be measured. For example, the composition of the reservoir fluid may be characterized by its ratio of classes of chemical compounds such as saturates, aromatics, resins and asphalteens (SARA). These chemical classes each have their own unique spectroscopic spectrum, and thus can be distinguished from each other optically in different spectral ranges. Such properties or characteristics may determine the plurality of spectral ranges to be processed. In some embodiments, the series of spectral analyzers 424 may include two spectral analyzers and a first optical transducer of a first spectral analyzer is formed of semiconductor material including silicon. In such embodiments, the second optical transducer of the second spectral analyzer is formed from a second semiconductor material to allow substantially non-overlapping spectral ranges. Non-limiting examples of such semiconductor materials include indium gallium arsenic alloy or germanium. In other embodiments, the series of spectral analyzers 424 may include three spectral analyzers and a first optical transducer of a first spectral analyzer is formed of a semiconductor material including aluminum indium phosphorus alloy. In such embodiments, substantially non-overlapping spectral ranges may be enabled by using a second optical transducer formed of semiconductor material including indium phosphide and a third photodiode formed of semiconductor material including germanium. Other semiconductor materials and their combinations are possible.

In operation, the fluid inlet 410 may receive the production fluid 406 proximate the production fluid's emergence 412 from the subterranean reservoir 414. The fluid inlet 410 may convey or allow fluid flow of the production fluid 406 to the first side 418 of the window 416. The illumination source 422 may generate the electromagnetic radiation that traverses the window 416 from the second side 420 to the first side 418. The interaction of electromagnetic radiation with the production fluid 406 proximate the first side 418 may produce the sample electromagnetic radiation. The sample electromagnetic radiation may be received by the series of spectral analyzers 424 and is progressively processed from shortest wavelengths to longest wavelengths as the sample electromagnetic radiation propagates therethrough. Each spectral analyzer may generate an electrical signal representing the sample electromagnetic radiation within one of the plurality of spectral ranges. The electrical signals may be received by the computational unit to produce data corresponding to one or more characteristics of the production fluid 406. The computational unit may store and process data to determine a characteristic of the production fluid 406 for each of the plurality of spectral ranges. While FIG. 4 illustrates a single measurement unit 404 only, this depiction is not intended as limiting. In some embodiments, two or more measurement units 404 may be disposed into the housing 402 to allow the tool 400 to measure properties of the production fluid 406 at multiple points.

Figure 5:
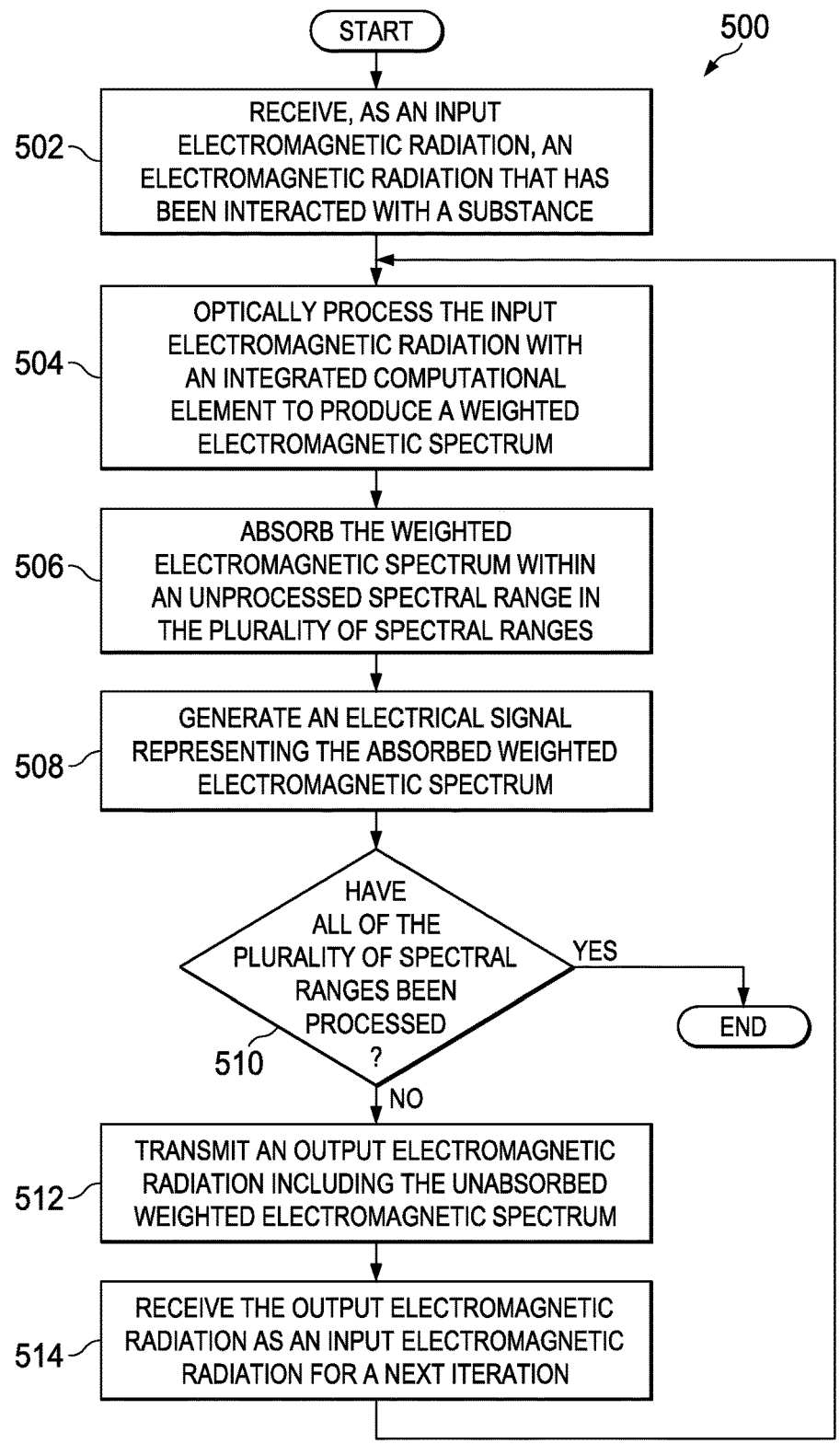
FIG. 5 is a flowchart of an illustrative embodiment of a method for processing a plurality of spectral ranges from electromagnetic radiation that has been interacted with a fluid.

Now referring primarily to FIG. 5, a schematic flowchart of an illustrative embodiment is shown of a method 500 for processing a plurality of spectral ranges from an electromagnetic radiation that has been interacted with a substance (i.e., a sample electromagnetic radiation). The method 500 may include the step 502 of receiving, as an input electromagnetic radiation, the electromagnetic radiation that has been interacted with the substance. The step 502 may occur when none of the plurality of spectral ranges has yet been processed (i.e., a first iteration of the method 500). The method 500 may also include the step 504 of optically-processing the input electromagnetic radiation with an integrated computational element to produce a weighted electromagnetic radiation. The method 500 may involve the step 506 of absorbing the weighted electromagnetic spectrum within an unprocessed spectral range in the plurality of spectral ranges. In some embodiments, the step 506 may involve detecting the weighted electromagnetic spectrum within an unprocessed spectral range in the plurality of spectral ranges using an optical transducer. In such embodiments, each of the plurality of spectral ranges corresponds to a distinct optical transducer. The method 500 may also involve the step 508 of generating an electrical signal representing the absorbed weighted electromagnetic spectrum. In some embodiments, the step 508 may further involve converting the electrical signal from the time domain to the frequency domain.

The method 500 may include a decision, represented by interrogatory 510, to determine if all of the plurality of spectral ranges have been processed. If all have been processed, the method 500 may end. If not, the method 500 may proceed to step 512 of transmitting an output electromagnetic radiation including the unabsorbed weighted electromagnetic spectrum. Step 512 may be followed by step 514, receiving the output electromagnetic radiation as an input electromagnetic radiation for a next iteration. The steps 504-514 may be iteratively repeated until each of the plurality of spectral ranges is processed. For each iteration, the output electromagnetic radiation of a preceding iteration may serve as the input electromagnetic radiation for a next iteration.

It will be appreciated that a number of the plurality, and hence a number of iterations, depends on information desired about the fluid or one or more constituents therein. The number of iterations is determined by those skilled in the art upon consideration of the application to which method 500 will be applied. In some embodiments, the number of iterations is two and a first spectral range encompasses visible light and a second spectral range encompasses infrared light. In other embodiments, the number of iterations is three and a first spectral range, a second spectral range, and a third spectral range encompass ultraviolet light, visible light, and infrared light, respectively. Other combinations of iterations and spectral ranges are possible.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

It will be understood that the benefits and advantages described above may relate to one embodiment or may relate to several embodiments. It will further be understood that reference to "an" item refers to one or more of those items.

The steps of the methods described herein may be carried out in any suitable order or simultaneous where appropriate. Where appropriate, aspects of any of the examples described above may be combined with aspects of any of the other examples described to form further examples having comparable or different properties and addressing the same or different problems.

In addition to the embodiments described above, many examples of specific combinations are within the scope of the disclosure, some which are detailed below.

Example 1

A optical computing system comprising:
 an illumination source that generates electromagnetic radiation, wherein the electromagnetic radiation interacts with a substance;
 a measurement unit comprising a series of spectral analyzers, wherein each spectral analyzer comprises an integrated computational element coupled to an optical transducer, and wherein each spectral analyzer is configured to process one of a plurality of spectral ranges;
 a computational unit coupled to the measurement unit, the computational unit comprising at least one memory and at least one processor; and
 wherein the computational unit stores data from the measurement unit and determines a characteristic of the substance for each of the plurality of spectral ranges.

Example 2

The system of Example 1, wherein the measurement unit further comprises a conversion circuit coupled to each optical transducer and operable to output electrical signals from the coupled optical transducers in a frequency domain.

Example 3

The system of Example 1, wherein the series of spectral analyzers, comprises a first spectral analyzer and a second spectral analyzer.

Example 4

The system of Example 3, wherein the measurement unit comprises a monolithic structure with the optical transducer of the first spectral analyzer deposited on an electrode, and the electrode deposited on the integrated computational element of the second spectral analyzer.

Example 5

The system of Example 3, wherein the first spectral analyzer comprises a first optical transducer formed of semiconductor material comprising silicon, and wherein the second spectral analyzer comprises a second optical transducer formed of semiconductor material comprising at least one of indium gallium arsenic alloy and germanium.

Example 6

The system of Example 1, wherein the series of spectral analyzers comprises a first spectral analyzer, a second spectral analyzer, and third spectral analyzer, and wherein the first spectral analyzer comprises a first optical transducer formed of semiconductor material comprising aluminum indium phosphorus alloy.

Example 7

The system of Example 6, wherein the second spectral analyzer comprises a second optical transducer formed of semiconductor material comprising indium phosphide and the third spectral analyzer comprises a third optical transducer formed of semiconductor material comprising germanium.

Example 8

An integrated computing apparatus comprising:
 a series of spectral analyzers, wherein each spectral analyzer comprises an integrated computational element coupled to an optical transducer, and wherein each spectral analyzer processes one of a plurality of spectral ranges; and
 wherein the spectral analyzers are arranged to process spectral ranges progressively from shortest wavelengths to longest wavelengths as electromagnetic radiation propagates through the series of spectral analyzers.

Example 9

The apparatus of Example 8, further comprising a transparent electrode coupled between each of the spectral analyzers.

Example 10

The apparatus of Example 8, wherein the series of spectral analyzers comprises a first spectral analyzer and a second spectral analyzer.

Example 11

The apparatus of Example 9, wherein the measurement unit comprises a monolithic structure with the optical transducer of the first spectral analyzer deposited on an electrode, and the electrode deposited on the integrated computational element of the second spectral analyzer.

Example 12

The apparatus of Example 9, wherein the first spectral analyzer comprises a first optical transducer formed of semiconductor material comprising silicon, and wherein the second spectral analyzer comprises a second optical transducer formed of semiconductor material comprising at least one of indium gallium arsenic alloy and germanium.

Example 13

The apparatus of Example 8, wherein the series of spectral analyzers comprises a first spectral analyzer, a second spectral analyzer, and a third spectral analyzer, the first spectral analyzer having a first optical transducer comprising a semiconductor material layer comprising silicon.

Example 14

The apparatus of Example 13, wherein the second spectral analyzer comprises a second optical transducer comprising a semiconductor material layer comprising indium gallium arsenic alloy, and wherein the third second spectral analyzer comprises a third optical transducer comprising a semiconductor material layer comprising germanium.

Example 15

The apparatus of Example 8, wherein the series of spectral analyzers comprises a first spectral analyzer, a second spectral analyzer, and a third spectral analyzer, the first spectral analyzer comprising a first optical transducer comprising a semiconductor material layer comprising aluminum indium phosphorus alloy.

Example 16

The apparatus of Example 15, wherein the second spectral analyzer comprises a second optical transducer comprising a semiconductor material layer comprising indium phosphide and wherein the third spectral analyzer comprises a third optical transducer comprising a semiconductor material layer comprising germanium.

Example 17

A method for processing sample electromagnetic radiation that has been interacted with a fluid, the method comprising:
  optically-processing the sample electromagnetic radiation with an integrated computational element to produce a weighted electromagnetic spectrum;
  absorbing the weighted electromagnetic spectrum within an unprocessed spectral range of the plurality of spectral ranges;
  generating an electrical signal representing the absorbed weighted electromagnetic spectrum;
  transmitting an output electromagnetic radiation signal comprising an unabsorbed weighted electromagnetic spectrum to a second integrated processing element;
  optically-processing the unabsorbed electromagnetic radiation with a second integrated computational element to produce a second weighted electromagnetic spectrum;
  absorbing the second weighted electromagnetic spectrum within a second unprocessed spectral range of the plurality of spectral ranges;
  generating a second electrical signal representing the absorbed second weighted electromagnetic spectrum; and
  transmitting the electrical signal and second electrical signal to a computing unit.

Example 18

The method of Example 17, wherein absorbing the weighted electromagnetic spectrum comprises:
  detecting the weighted electromagnetic spectrum within an unprocessed spectral range in the plurality of spectral ranges using an optical transducer; and
  wherein the optical transducer is selected and configured to absorb electromagnetic radiation in the absorbed spectral range.

Example 19

The method of Example 17, wherein the first weighted electromagnetic spectrum encompasses visible light and wherein the second weighted electromagnetic spectrum encompasses infrared light.

Example 20

The method of Example 19, further comprising:
  transmitting a second output electromagnetic radiation signal comprising a second unabsorbed weighted electromagnetic spectrum to a third integrated processing element;
  optically-processing the second unabsorbed electromagnetic radiation with a third integrated computational element to produce a third weighted electromagnetic spectrum;
  absorbing the third weighted electromagnetic spectrum within a third unprocessed spectral range of the plurality of spectral ranges; and
  generating a third electrical signal representing the absorbed third weighted electromagnetic spectrum, and transmitting the third electrical signal to a computing unit;

wherein the third weighted electromagnetic spectrum encompasses ultraviolet light.

Example 21

A method of manufacturing an integrated computing apparatus, the method comprising:
coupling a first spectral analyzer to a second spectral analyzer;
wherein each spectral analyzer comprises an integrated computational element coupled to an optical transducer, and
wherein the spectral analyzers are arranged to process spectral ranges progressively from shortest wavelengths to longest wavelengths as electromagnetic radiation propagates through the spectral analyzers.

Example 22

The method of Example 21, wherein the coupling the first spectral analyzer to the second spectral analyzer comprises:
coupling the first spectral analyzer to an electrode; and
coupling the electrode to the second spectral analyzer.

Example 23

The method of Example 22, wherein the coupling the first spectral analyzer to an electrode comprises coupling an optical transducer of the first spectral analyzer to the electrode, and wherein the coupling the electrode to the second spectral analyzer comprises coupling the electrode to an integrated computational element of the second spectral analyzer.

Example 24

The method of Example 23, wherein the coupling an optical transducer of the first spectral analyzer to the electrode comprises depositing the optical transducer of the first spectral analyzer on the electrode, and wherein coupling the electrode to the integrated computational element of the second spectral analyzer comprises depositing the electrode on the integrated computational element of the second spectral analyzer, thereby forming a monolithic structure with the integrated computing apparatus.

It will be understood that the above description of the embodiments is given by way of example only and that various modifications may be made by those skilled in the art. The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

We claim:

1. An optical computing system comprising:
an illumination source that generates electromagnetic radiation, wherein the electromagnetic radiation interacts with a substance;
a measurement unit comprising a series of spectral analyzers, wherein each spectral analyzer comprises an integrated computational element coupled to an optical transducer, and wherein each spectral analyzer is configured to process one of a plurality of spectral ranges and transmit the remaining non-processed spectral ranges to an adjacent spectral analyzer;
a computational unit coupled to the measurement unit, the computational unit comprising at least one memory and at least one processor; and
wherein the computational unit stores data from the measurement unit and determines a characteristic of the substance for each of the plurality of spectral ranges.

2. The system of claim 1, wherein the measurement unit further comprises a conversion circuit coupled to each optical transducer and operable to output electrical signals from the coupled optical transducers in a frequency domain.

3. The system of claim 1, wherein the series of spectral analyzers, comprises a first spectral analyzer and a second spectral analyzer.

4. The system of claim 3, wherein the measurement unit comprises a monolithic structure with the optical transducer of the first spectral analyzer deposited on an electrode, and the electrode deposited on the integrated computational element of the second spectral analyzer.

5. The system of claim 3, wherein the first spectral analyzer comprises a first optical transducer formed of semiconductor material comprising silicon, and wherein the second spectral analyzer comprises a second optical transducer formed of semiconductor material comprising at least one of indium gallium arsenic alloy and germanium.

6. The system of claim 1, wherein the series of spectral analyzers comprises a first spectral analyzer, a second spectral analyzer, and third spectral analyzer, and wherein the first spectral analyzer comprises a first optical transducer formed of semiconductor material comprising aluminum indium phosphorus alloy.

7. The system of claim 6, wherein the second spectral analyzer comprises a second optical transducer formed of semiconductor material comprising indium phosphide and the third spectral analyzer comprises a third optical transducer formed of semiconductor material comprising germanium.

8. An integrated computing apparatus comprising:
a series of spectral analyzers, wherein each spectral analyzer comprises an integrated computational element coupled to an optical transducer, and wherein each spectral analyzer processes one of a plurality of spectral ranges; and
wherein the spectral analyzers are arranged to process spectral ranges progressively from shortest wavelengths to longest wavelengths as electromagnetic radiation propagates through the series of spectral analyzers and to transmit the remaining non-processed spectral ranges to an adjacent spectral analyzer.

9. The apparatus of claim 8, further comprising a transparent electrode coupled between each of the spectral analyzers.

10. The apparatus of claim 8, wherein the series of spectral analyzers comprises a first spectral analyzer and a second spectral analyzer.

11. The apparatus of claim 9, wherein the measurement unit comprises a monolithic structure with the optical transducer of the first spectral analyzer deposited on an electrode, and the electrode deposited on the integrated computational element of the second spectral analyzer.

12. The apparatus of claim 9, wherein the first spectral analyzer comprises a first optical transducer formed of semiconductor material comprising silicon, and wherein the second spectral analyzer comprises a second optical transducer formed of semiconductor material comprising at least one of indium gallium arsenic alloy and germanium.

13. The apparatus of claim 8, wherein the series of spectral analyzers comprises a first spectral analyzer, a second spectral analyzer, and a third spectral analyzer, the first spectral analyzer having a first optical transducer comprising a semiconductor material layer comprising silicon.

14. The apparatus of claim 13, wherein the second spectral analyzer comprises a second optical transducer comprising a semiconductor material layer comprising indium gallium arsenic alloy, and wherein the third spectral analyzer comprises a third optical transducer comprising a semiconductor material layer comprising germanium.

15. The apparatus of claim 8, wherein the series of spectral analyzers comprises a first spectral analyzer, a second spectral analyzer, and a third spectral analyzer, the first spectral analyzer comprising a first optical transducer comprising a semiconductor material layer comprising aluminum indium phosphorus alloy.

16. The apparatus of claim 15, wherein the second spectral analyzer comprises a second optical transducer comprising a semiconductor material layer comprising indium phosphide and wherein the third spectral analyzer comprises a third optical transducer comprising a semiconductor material layer comprising germanium.

17. A method for processing sample electromagnetic radiation that has been interacted with a fluid, the method comprising:
   optically-processing the sample electromagnetic radiation with an integrated computational element to produce a weighted electromagnetic spectrum;
   absorbing the weighted electromagnetic spectrum within an unprocessed spectral range of the plurality of spectral ranges;
   generating an electrical signal representing the absorbed weighted electromagnetic spectrum;
   transmitting an output electromagnetic radiation signal comprising an unabsorbed weighted electromagnetic spectrum to a second integrated processing element;
   optically-processing the unabsorbed electromagnetic radiation with a second integrated computational element to produce a second weighted electromagnetic spectrum;
   absorbing the second weighted electromagnetic spectrum within a second unprocessed spectral range of the plurality of spectral ranges;
   generating a second electrical signal representing the absorbed second weighted electromagnetic spectrum; and
   transmitting the electrical signal and second electrical signal to a computing unit.

18. The method of claim 17, wherein absorbing the weighted electromagnetic spectrum comprises:
   detecting the weighted electromagnetic spectrum within an unprocessed spectral range in the plurality of spectral ranges using an optical transducer; and
   wherein the optical transducer is selected and configured to absorb electromagnetic radiation in the absorbed spectral range.

19. The method of claim 17, wherein the first weighted electromagnetic spectrum encompasses visible light and wherein the second weighted electromagnetic spectrum encompasses infrared light.

20. The method of claim 19, further comprising:
   transmitting a second output electromagnetic radiation signal comprising a second unabsorbed weighted electromagnetic spectrum to a third integrated processing element;
   optically-processing the second unabsorbed electromagnetic radiation with a third integrated computational element to produce a third weighted electromagnetic spectrum;
   absorbing the third weighted electromagnetic spectrum within a third unprocessed spectral range of the plurality of spectral ranges; and
   generating a third electrical signal representing the absorbed third weighted electromagnetic spectrum, and transmitting the third electrical signal to a computing unit;
   wherein the third weighted electromagnetic spectrum encompasses ultraviolet light.

21. A method of manufacturing an integrated computing apparatus, the method comprising:
   coupling a first spectral analyzer to a second spectral analyzer;
   wherein each spectral analyzer comprises an integrated computational element coupled to an optical transducer, and wherein the spectral analyzers are arranged to process spectral ranges progressively from shortest wavelengths to longest wavelengths as electromagnetic radiation propagates through the spectral analyzers and to transmit the remaining non-processed spectral ranges to an adjacent spectral analyzer.

22. The method of claim 21, wherein the coupling the first spectral analyzer to the second spectral analyzer comprises:
   coupling the first spectral analyzer to an electrode; and
   coupling the electrode to the second spectral analyzer.

23. The method of claim 22, wherein the coupling the first spectral analyzer to an electrode comprises coupling an optical transducer of the first spectral analyzer to the electrode, and wherein the coupling the electrode to the second spectral analyzer comprises coupling the electrode to an integrated computational element of the second spectral analyzer.

24. The method of claim 23, wherein the coupling an optical transducer of the first spectral analyzer to the electrode comprises depositing the optical transducer of the first spectral analyzer on the electrode, and wherein coupling the electrode to the integrated computational element of the second spectral analyzer comprises depositing the electrode on the integrated computational element of the second spectral analyzer, thereby forming a monolithic structure with the integrated computing apparatus.

* * * * *